United States Patent
Choi et al.

(10) Patent No.: US 8,672,529 B2
(45) Date of Patent: Mar. 18, 2014

(54) BACKLIGHT UNIT

(75) Inventors: Sun Choi, Seoul (KR); Geun Young Kim, Suwon (KR); Jung Hun Lee, Seoul (KR); Jong Jin Park, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 13/118,972

(22) Filed: May 31, 2011

(65) Prior Publication Data

US 2011/0292683 A1    Dec. 1, 2011

(30) Foreign Application Priority Data

May 31, 2010 (KR) .................. 10-2010-0051022

(51) Int. Cl.
*F21V 7/04* (2006.01)

(52) U.S. Cl.
USPC ........... 362/612; 362/613; 362/630; 362/631; 349/58; 349/65

(58) Field of Classification Search
USPC .......... 345/102; 349/62, 56, 58, 65; 362/97.1, 362/97.2, 612, 613, 630, 631, 295
See application file for complete search history.

(56) References Cited

U.S. PATENT DOCUMENTS

| | | | |
|---|---|---|---|
| 2008/0030650 A1 | 2/2008 | Kitagawa et al. | |
| 2009/0167990 A1 | 7/2009 | Konno et al. | |
| 2009/0168456 A1 | 7/2009 | Park et al. | |
| 2010/0214281 A1 | 8/2010 | Ueno et al. | |
| 2010/0245397 A1* | 9/2010 | Choe et al. | 345/690 |

FOREIGN PATENT DOCUMENTS

| | | |
|---|---|---|
| CN | 101097054 A | 1/2008 |
| CN | 101680632 A | 3/2010 |
| EP | 2312660 A2 | 4/2011 |
| JP | 2007-128820 A | 5/2007 |
| KR | 10-2005-0101526 A | 10/2005 |
| KR | 10-2007-0118887 A | 12/2007 |

(Continued)

OTHER PUBLICATIONS

Communication dated Oct. 24, 2011 from the European Patent Office in counterpart European application No. 11168276.1.

(Continued)

*Primary Examiner* — Stephen F Husar
(74) *Attorney, Agent, or Firm* — Sughrue Mion, PLLC

(57) ABSTRACT

There is provided a backlight unit. The backlight unit includes a light guiding plate, a light source module including a substrate provided with a circuit wiring and a plurality of light emitting diode (LED) blocks each including one or more LED mounted on the substrate to be positioned vertically with respect to the substrate, the one or more LED being disposed to face a side surface of the light guiding plate, a bottom chassis including a base and a sidewall upwardly extending from a circumference of the base, and accommodating the light source module and the light guiding plate in such a manner that the one or more LED is disposed to be adjacent to the sidewall, and a driving unit controlling a current signal applied to each of the plurality of LED blocks to thereby control brightness for each LED block.

15 Claims, 9 Drawing Sheets

(56) References Cited

FOREIGN PATENT DOCUMENTS

| KR | 10-2008-0008743 A | 1/2008 |
|---|---|---|
| KR | 10-2008-0037415 A | 4/2008 |
| KR | 10-2008-0041920 A | 5/2008 |
| KR | 10-2008-0060736 A | 7/2008 |
| KR | 10-2008-0087411 A | 10/2008 |
| TW | 200835967 A | 9/2008 |
| TW | M366097 U1 | 10/2009 |
| TW | M375906 U1 | 3/2010 |
| WO | WO 2010002226 A2 | 1/2010 |

OTHER PUBLICATIONS

Communication, dated Jul. 11, 2013, issued by the State Intellectual Property Office of P.R. China in counterpart Chinese Patent Application No. 201110145643.1.

Communication dated Nov. 15, 2012 issued by the State Intellectual Property Office of P.R. China in counterpart Chinese Patent Application No. 201110145643.1.

Communication dated Jan. 23, 2014, issued by the Taiwan Intellectual Property Office in counterpart Taiwanese Patent Application No. 100118588.

\* cited by examiner (a)

(b)

(c)

BACKLIGHT UNIT

CROSS-REFERENCE TO RELATED APPLICATIONS

This application claims the priority of Korean Patent Application No. 10-2010-0051022 filed on May 31, 2010, in the Korean Intellectual Property Office, the disclosure of which is incorporated herein by reference.

BACKGROUND OF THE INVENTION

1. Field of the Invention

The present invention relates to a backlight unit, and more particularly, to a backlight unit capable of being used in the lighting of a display device or the like by employing a light emitting device as a light source.

2. Description of the Related Art

In general, a liquid crystal display (LCD), currently a common thin display device, has been applied to various devices, such as a wall-mounted type television, a notebook computer, a monitor for a desktop computer, a navigation system, a personal digital assistant (PDA), a cellular phone, and a portable computer game console or the like. A liquid crystal constituting the display device of the liquid crystal display may not emit light by itself, and may merely perform a simple function of transmitting or blocking light according to an electrical signal applied thereto.

Accordingly, in order to display information on a liquid crystal panel, a so-called surface light emitting device for irradiating the liquid crystal panel from the rear, a backlight unit needs to be separately provided in a liquid crystal display. Such a backlight unit may need to increase the luminance of light and form an even surface light source to irradiate light onto a liquid crystal panel, which is very important in view of product quality.

Since a general backlight unit has a small size and a long lifespan and directly converts electrical energy into optical energy, a light emitting diode (LED), having advantages such as high energy efficiency and a low operating voltage, has been used as a light source for the backlight unit.

In addition, backlight units are classified into an edge type backlight unit (side view type) and a direct type backlight unit (top view type) based on the mounting position of a light source. In the edge type backlight unit, a bar-shaped light source is located at the side of a liquid crystal panel to irradiate light towards the liquid crystal panel via a light guiding plate. In contrast with the edge type backlight unit, the direct type backlight unit directly irradiates light onto the liquid crystal panel from a surface light source disposed under the liquid crystal panel.

With the recent trend towards large, thin, highly functional image display devices, research into the realization of a backlight having a reduced thickness while exhibiting superior optical characteristics by allowing for local dimming, even in a large screen liquid crystal display, has been actively conducted.

However, in the case of an edge type backlight unit slimmer than the direct type backlight unit, it is advantageous in that an edge type backlight having a relatively small size, for example, 17 inches or less, may be manufactured to have a relatively reduced thickness. However, in the case of an LCD backlight light source having a larger size, that is, 40~70 inches or more, obtaining sufficient brightness in the backlight light source may be difficult and brightness uniformity may consequently be deteriorated.

In addition, the edge type backlight unit may not be suitable to a partial driving method, such as local dimming, and the applying thereof may be difficult in a liquid crystal panel having a relatively large area.

SUMMARY OF THE INVENTION

An aspect of the present invention provides an edge type backlight unit which is advantageous for a large, thin product using the backlight unit and capable of realizing effective local dimming.

According to an aspect of the present invention, there is provided a backlight unit, including: a light guiding plate; a light source module including a substrate provided with a circuit wiring and a plurality of light emitting diode (LED) blocks each including one or more LED mounted on the substrate to be positioned vertically with respect to the substrate, the one or more LED being disposed to face a side surface of the light guiding plate; a bottom chassis including a base and a sidewall upwardly extending from a circumference of the base, and accommodating the light source module and the light guiding plate in such a manner that the one or more LED is disposed to be adjacent to the sidewall; and a driving unit controlling a current signal applied to each of the plurality of LED blocks to thereby control brightness for each LED block.

In the light source module, the substrate may be mounted on the base to be positioned horizontally with respect to the base along the sidewall of the bottom chassis in such a manner that a light emitting surface of the one or more LED faces the light guiding plate and the other surface of the one or more LED faces the sidewall of the bottom chassis.

The light source module may be disposed between at least one side surface of the light guiding plate and the sidewall of the bottom chassis.

The light source module may include a plurality of light source modules, and the plurality of light source modules may include a first light source module and a second light source module respectively disposed at one side surface of the light guiding plate and the other side surface of the light guiding plate.

The backlight unit may further include a third light source module and a fourth light source module respectively disposed at side surfaces of the light guiding plate, positioned vertically with respect to the first and second light source modules, while having the light guiding plate therebetween, and having a configuration the same as that of the first and second light source modules.

The light guiding plate may be formed of at least one or more division member.

The light guiding plate may be provided with one or more groove portion altering a path of light.

The groove portion may be depressed at a predetermined depth from a lower surface of the light guiding plate towards an upper surface of the light guiding plate.

The groove portion may be disposed in a horizontal direction and a vertical direction of the light guiding plate from a center of the light guiding plate.

The one or more LED may include a body having a cavity formed therein and is equipped with lead terminals along a side surface and an end surface of the body, the lead terminals electrically connected to the circuit wiring to thereby be mounted on the substrate via the side surface and the end surface.

The lead terminals may include a first lead provided to be co-planar with a rear surface of the body and projected outwardly from the end surface of the body, and a second lead bent vertically from an end of the first lead to be extended towards a front surface of the body and having one end bent horizontally towards the side surface of the body.

The second lead may have an overall 'L' shaped structure so as to be parallel with the end surface and the side surface of the body.

The one or more LED may include a heat sink penetrating the body to be outwardly exposed through the rear surface of the body, in a bottom surface of the cavity.

The backlight unit may further include a reflecting plate disposed under the light guiding plate.

The backlight unit may further include an optical sheet disposed on the light guiding plate.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
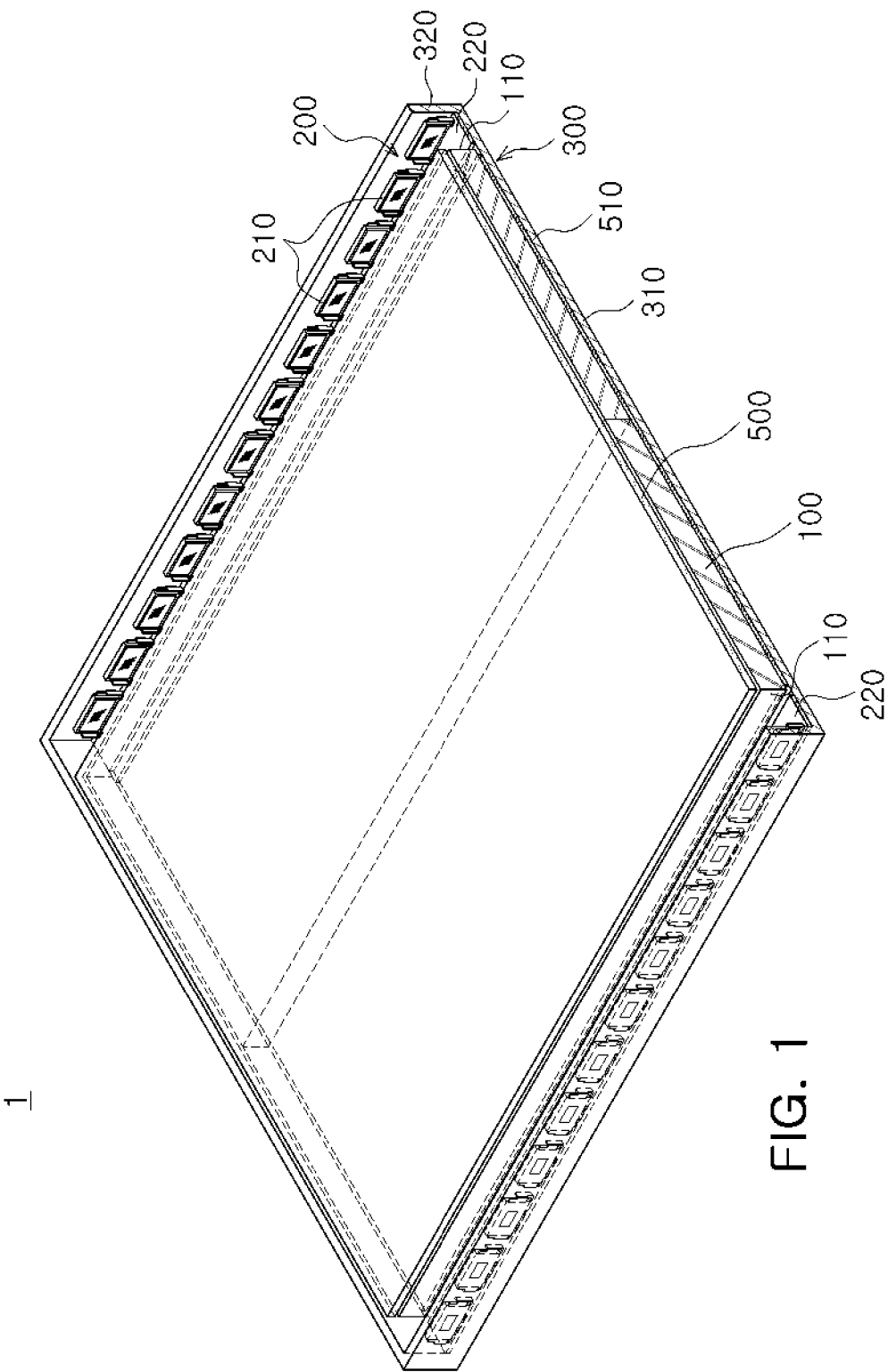
FIG. 1 is a schematic diagram of a backlight unit according to an embodiment of the present invention.

A backlight unit according to embodiments of the present invention will be explained with reference to the drawings hereinafter.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and sizes of components are exaggerated for clarity. The same or equivalent elements are referred to by the same reference numerals throughout the specification.

A backlight unit according to an embodiment of the present invention will be explained with reference to FIGS. 1 through 5.

Figure 2:
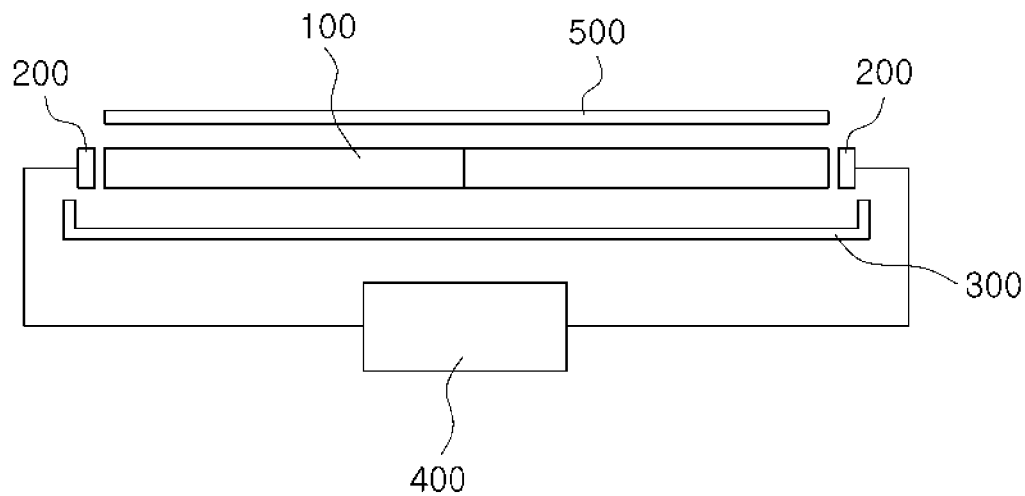
FIG. 2 is a schematic cross sectional view of the backlight unit of FIG. 1.
Figure 3:
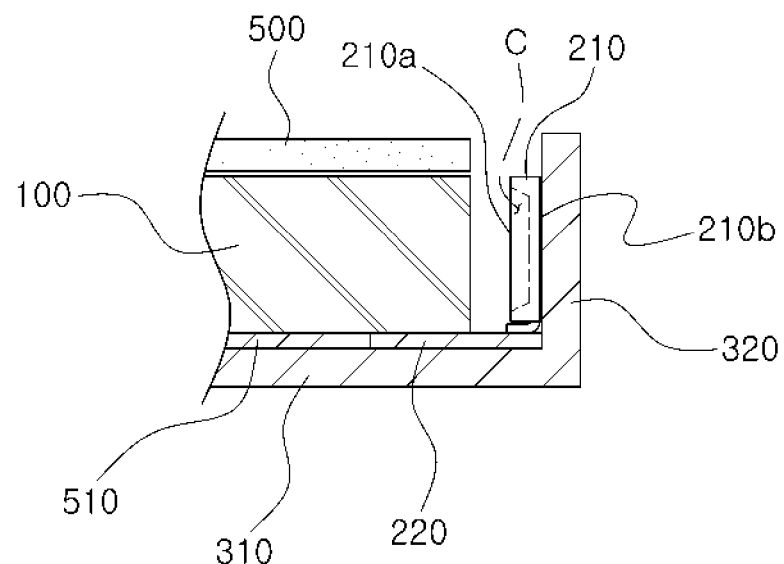
FIG. 3 is an expanded view schematically showing a light source module disposed between a light guiding plate and a sidewall of a bottom chassis in the backlight unit of FIG. 1.

FIG. 1 is a schematic diagram of a backlight unit according to an embodiment of the present invention. FIG. 2 is a schematic cross sectional view of the backlight unit of FIG. 1. FIG. 3 is an expanded view schematically showing a light source module disposed between a light guiding plate and a sidewall of a bottom chassis in the backlight unit of FIG. 1.

Referring to FIG. 1, a backlight unit 1 according to the embodiment of the present invention may irradiate light towards a liquid panel (not shown) disposed on the backlight unit 1, and include a light guiding plate 100, a light source module 200, a bottom chassis 300, and a driving unit 400. The backlight unit 1 may further include an optical sheet 500 disposed on the light guiding plate 100 and supplied with light.

The bottom chassis 300 may be a frame member accommodating the light guiding plate 100 and the light source module 200 therein to support the light guiding plate 100 and the light source module 200.

The bottom chassis 300 may have a box-shaped structure formed of a flat base 310 and a sidewall 320 upwardly extending from the circumference of the base 310 and having an upper portion (or the front) exposed to the outside. In general, the bottom chassis 300 may be made of a metal material in view of heat radiation or the like; however, it is not limited thereto. In addition, the remaining components constituting the backlight unit, such as the light source module 200 and light guiding plate 100 may be disposed inside the bottom chassis 300.

The light guiding plate 100 may have a rectangular parallelepiped plate shape, and a light incidence surface 110 on which the light source module 200 is disposed and light is incident to may be provided along a side surface in the major axis direction of the light guiding plate 100.

The light guiding plate 100 may be made of a transparent material, such as polymethylmethacrylate (PMMA) in order to smoothly guide light incident to the light incidence surface 110. The lower surface of the light guiding plate 100 may be provided with a specific pattern (not shown), such as prominences and depressions or the like, to thereby allow light advancing downwardly of the light guiding plate 100 to be reflected upwardly.

The upper part of the light guiding plate 100 may include an optical sheet 500 in which diffuser sheets diffusing light emitted to a liquid crystal panel (not shown) in various directions or prism sheets collecting the light emitted to the liquid crystal panel into a front viewing angle are selectively stacked to thereby allow for the improvement of luminance; however, the optical sheet 500 may not be an essential component in the embodiment of the present invention.

A reflecting plate 510 may further be provided between the light guiding plate 100 and the bottom chassis 300, as needed.

The light source module 200 including a plurality of light emitting diodes (LEDs) to emit white light may be a unit capable of being employed as a surface light source or a line light source having a predetermined area. The light source module 200 may include a plurality of LED blocks B having a substrate 220 and one or more LED 210 mounted thereon.

The light source module 200 may be provided between at least one side surface of the light guiding plate 100 and the sidewall 320 of the bottom chassis 300. In particular, the light source module 200 may be disposed to be adjacent to the sidewall 320 of the bottom chassis 300 along the side surface of the light guiding plate 100 such that the LED 210 faces the side surface of the light guiding plate 100.

Here, the one or more LED 210 may be a white LED; however, the present invention is not limited thereto. The LED 210 may be a general package product including an LED chip 211 therein. In particular, the LED 210 may be mounted on the substrate 220 to be positioned vertically with respect to the substrate 220 such that alight emitting surface 210A thereof faces the light incidence surface 110 of the light guiding plate 100.

Figure 4:
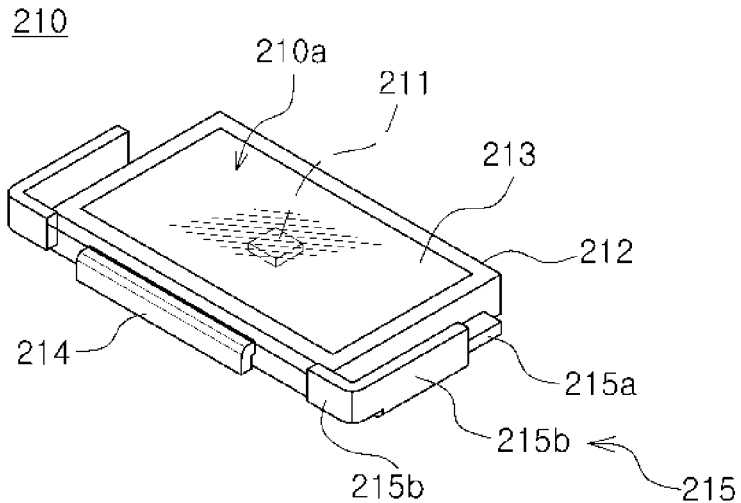
FIGS. 4A through 4C are schematic expanded views of a light emitting diode (LED) constituting the light source module.
Figure 4:
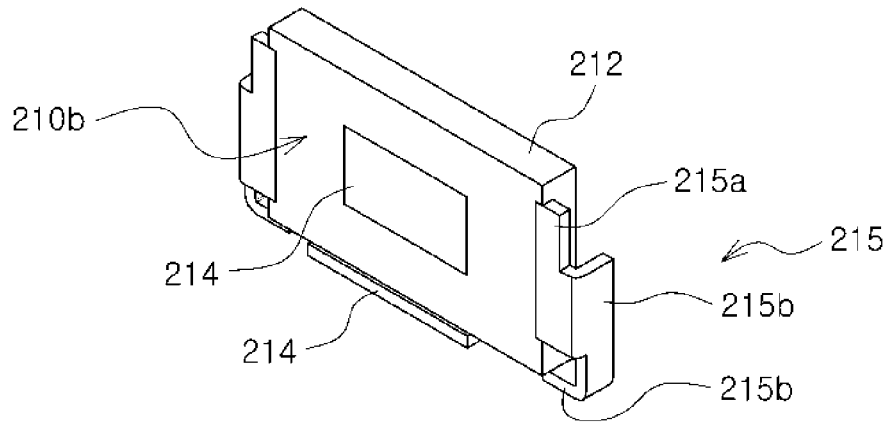
Figure 4:
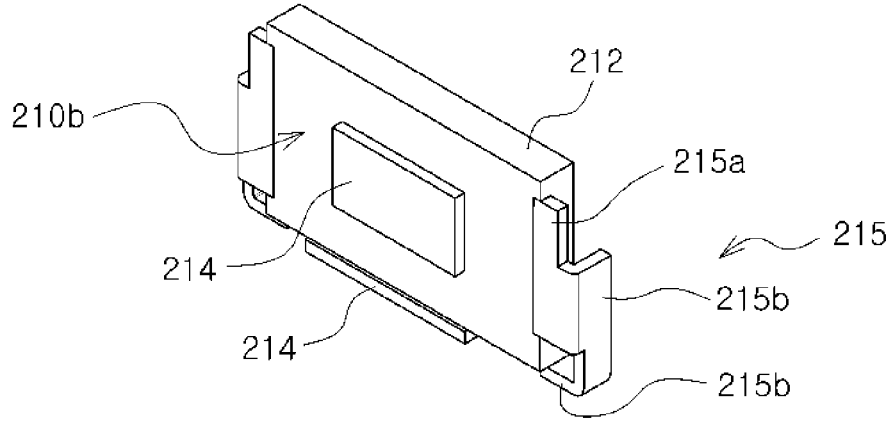
Figure 5:
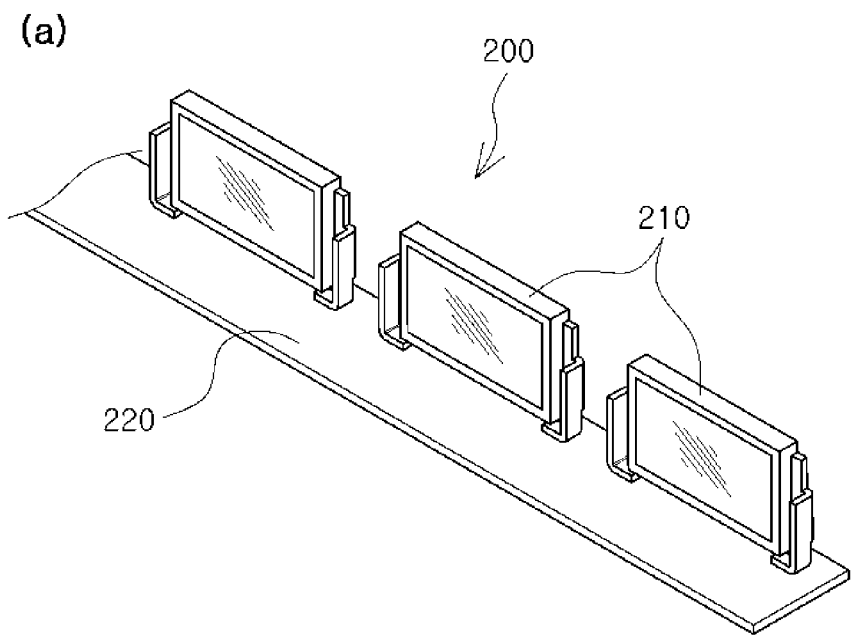
FIGS. 5A through 5C show a perspective view schematically showing the light source module and cross sectional views schematically showing the LED provided to be adjacent to the sidewall of the bottom chassis.
Figure 5:
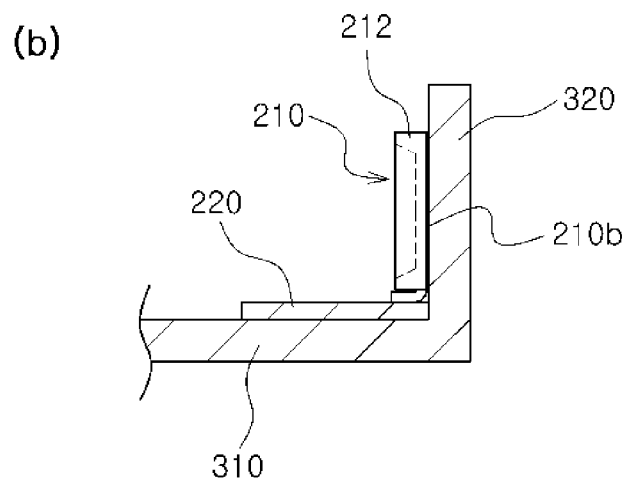
Figure 5:
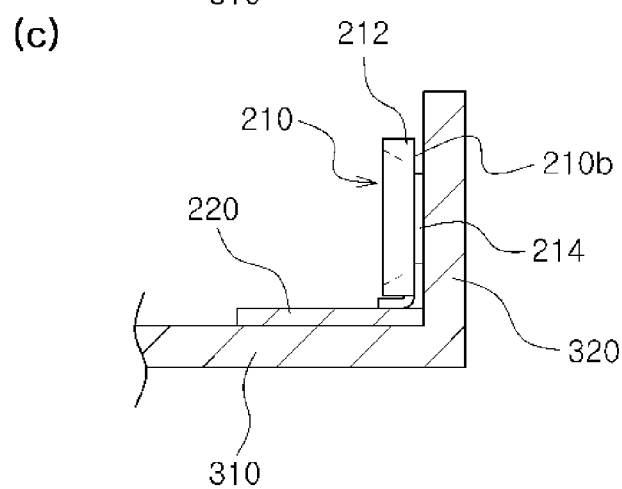

Referring to FIGS. 4 and 5, the structure of the LED 210 will be explained in detail.

FIGS. 4A through 4C are schematic expanded views of a light emitting diode (LED) constituting the light source module. FIGS. 5A through 5C show a perspective view schematically showing the light source module and cross sectional views schematically showing the LED provided to be adjacent to the sidewall of the bottom chassis.

As in FIG. 4A, the LED 210 may include a body 212 having a rectangular parallelepiped shape and made of silicon or ceramic. The front surface of the body 212, the light emitting surface 210A may be provided with a cavity C exposed to the outside to thereby have the LED chip mounted therein.

The cavity C may be filled with a transparent sealing member 213 so as to protect the LED chip 211, and the sealing member 213 may contain a fluorescent substance (not shown) in order to convert the wavelength of light emitted from the LED chip 211.

As shown in FIGS. 4B and 4C, the bottom surface of the cavity C, in which the LED chip is mounted, may be provided with a heat sink 214 penetrating the body 212 to be outwardly exposed through a rear surface 210B of the body. In this case, the heat sink 214 may project from the rear surface 210B of the body 212. Thus, heat generated from the LED chip 211 may be emitted to the outside via the heat sink 214.

Further, lead terminals 215 electrically connecting the LED chip 211 with a circuit wiring (not shown) may be provided along the side surface of the body 212.

In particular, the lead terminals 215 may include a first lead 215A provided to be co-planar with the rear surface 210B of the body 212 and projected outwardly from an end surface of the body, and a second lead bent vertically from an end of the first lead to be extended towards a front surface of the body and having one end bent horizontally towards a side surface of the body.

Further, the second lead 215B may be integrated with the first lead 215A and have an overall 'L' shaped structure such that the second lead 215B may be formed to be parallel with the end surface and the side surface of the body 212.

Accordingly, the surfaces with which the lead terminals 215 are equipped, in particular, the side surface with which the second lead 215B is equipped, may be mounted on the substrate 220 so as to face the substrate 220, whereby the LED 210 may be mounted on the substrate 220 to be positioned vertically with respect to the substrate 220 via the side surface of the body 212 thereof.

In this case, the heat sink 214 may be outwardly projected from the side surface of the body 212, with which the second lead 215B is equipped, and may be provided horizontally with respect to the side surface of the body 212, together with the second lead 215B.

Therefore, when the body 212 is mounted on the substrate 220, the heat sink 214 along with the second lead 215B may come into contact with the substrate 220 to thereby allow for the provision of a wider mounting area and a stable mounting structure. Further, heat generated from the LED 210 may be transferred to the substrate 220 via the heat sink 214, whereby thermal conductivity may be enhanced.

The substrate 220 may be provided with a circuit wiring (not shown) electrically connected with the LED 210 and have an overall bar-shaped structure as shown in FIG. 5A.

The substrate 220 may be disposed on the base 310 to be positioned horizontally with respect to the base 310 along the sidewall 320 in such a manner that the front surface of the LED 210, the light emitting surface 210A faces the side surface of the light guiding plate 100 and the rear surface 210B of the LED 210 faces the sidewall 320 of the bottom chassis 300 to come into contact therewith. In this case, the heat sink 214 exposed to the rear surface 210B of the LED body 212 may directly come into contact with the sidewall 320, as shown in FIGS. 5B and 5C.

Through the disposition structure of the substrate 220, heat generated from the LED 210 may be primarily conducted directly to the sidewall 320 of the bottom chassis 300 to be emitted to the outside, and secondarily conducted to the base 310 of the bottom chassis 300 via the substrate 220 to be emitted to the outside. Accordingly, the heat generated from the LED 210 may be much more efficiently conducted to the bottom chassis 300 by increasing a contact area with the bottom chassis 300 to thereby allow for the improvement of thermal efficiency.

Figure 6A:
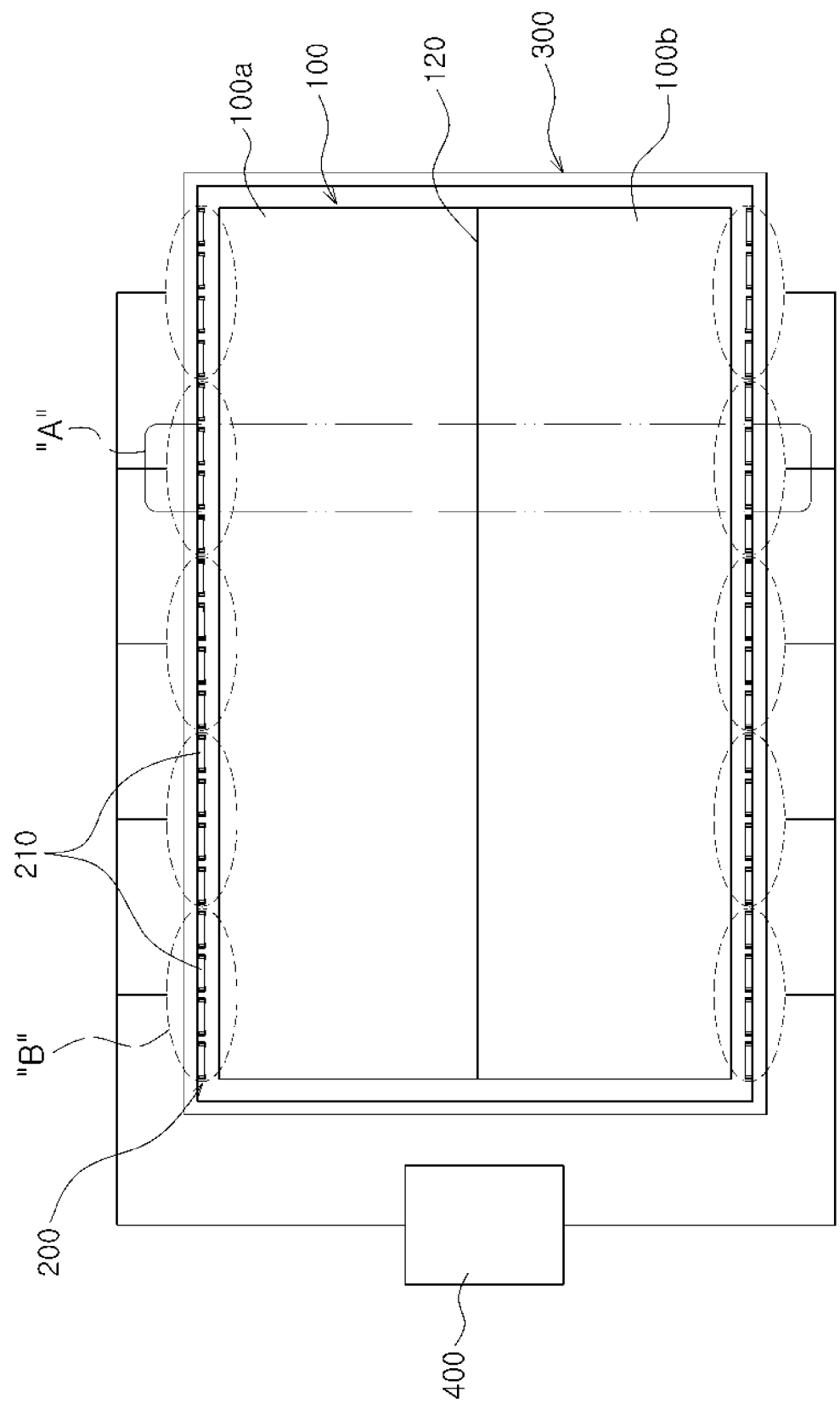
FIGS. 6A and 6B are top views schematically showing the light guiding plate and the light source module in the backlight unit of FIG. 1, when viewed from above.
Figure 6B:
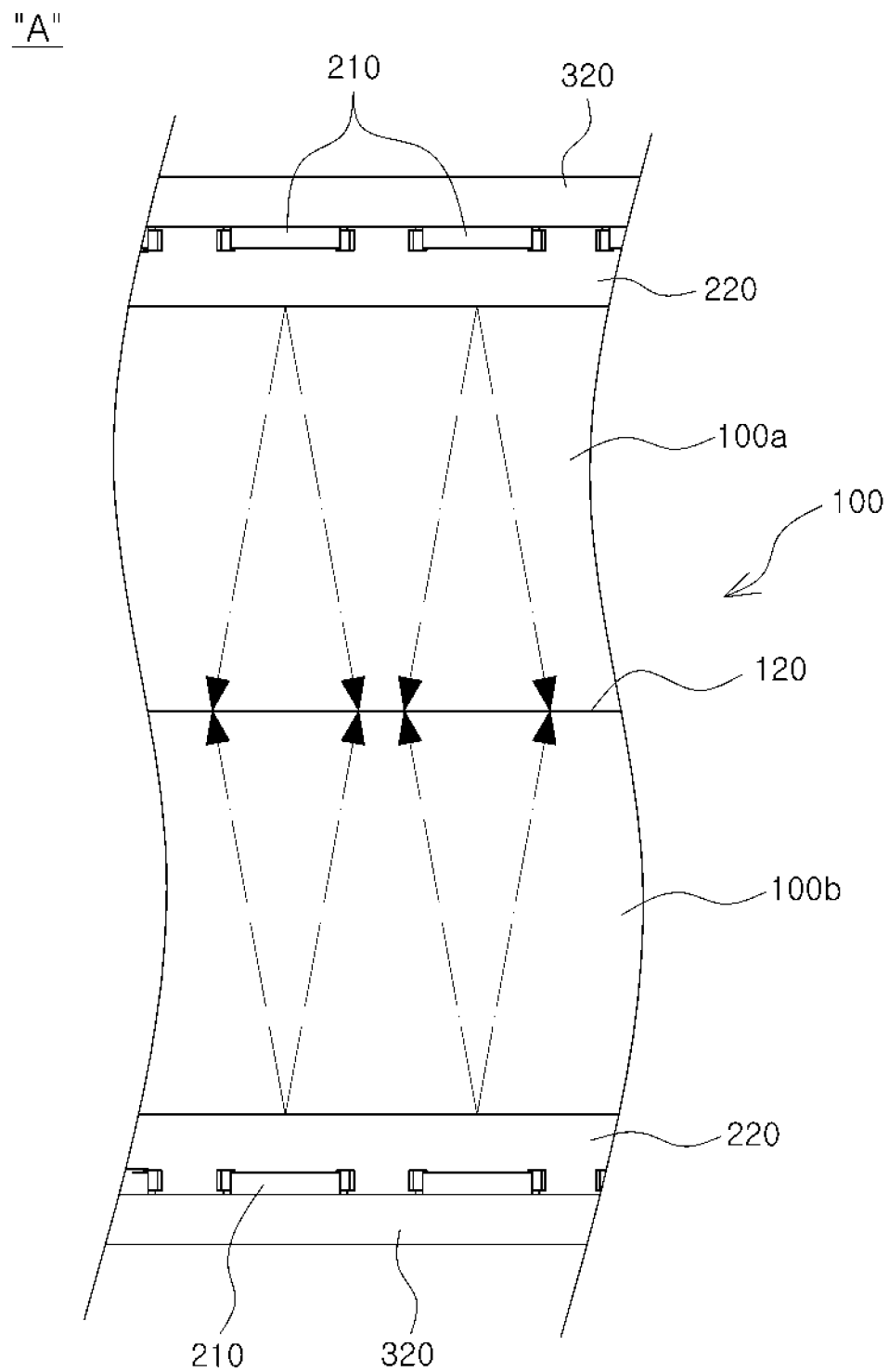
Figure 7:
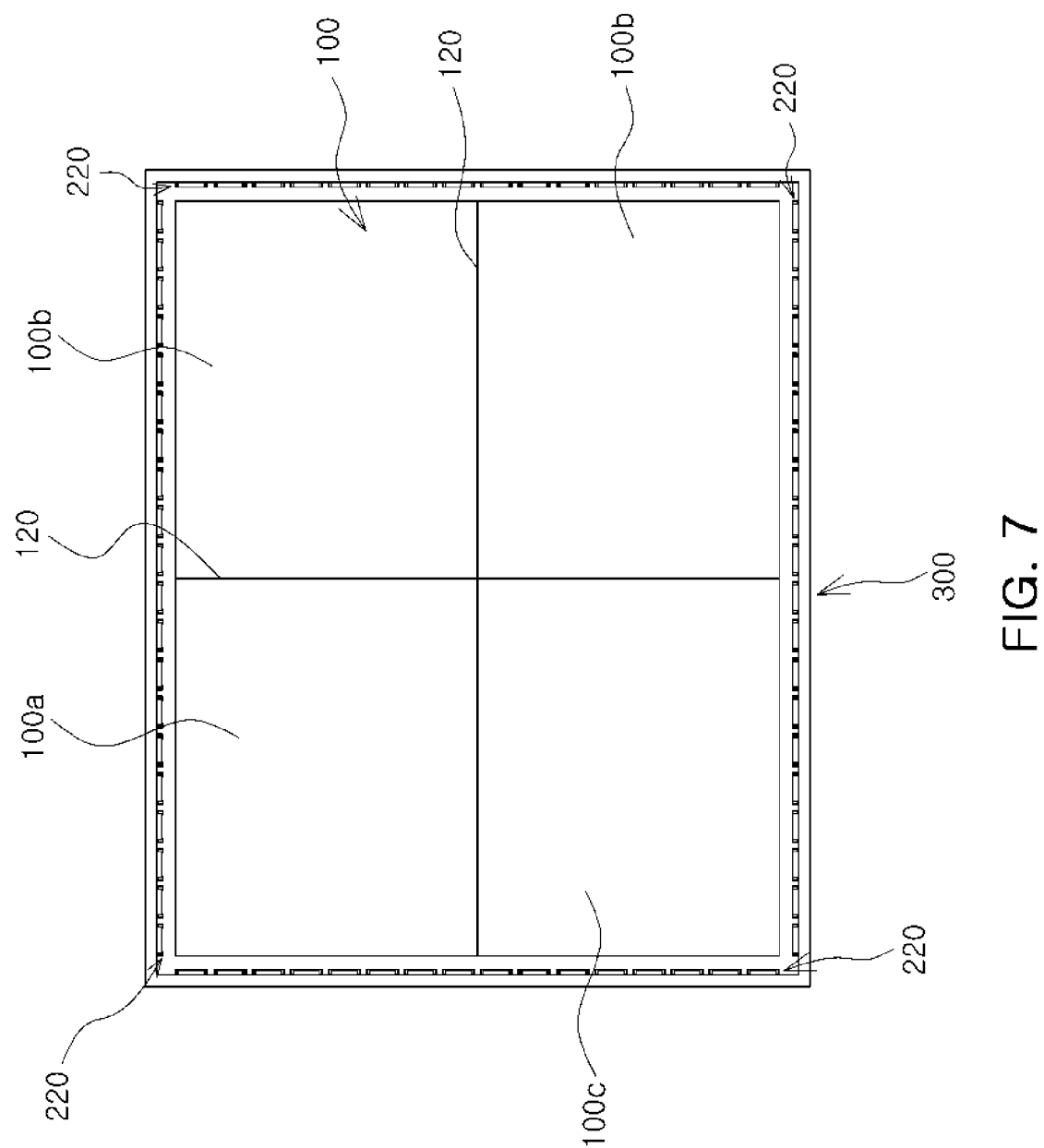
FIG. 7 is a top view showing the light guiding plate and the light source module according to a modified embodiment from that of FIGS. 6A and 6B, when viewed from above.

Meanwhile, referring to FIGS. 6 and 7, a method of implementing local dimming in the edge type backlight unit according to the exemplary embodiment of the present invention, in which the light source module 200 is disposed along the side surface of the light guiding plate 100 in such a manner as to come into contact with the sidewall 320 of the bottom chassis 300.

FIGS. 6A and 6B are top views schematically showing the light guiding plate and the light source module in the backlight unit of FIG. 1, when viewed from above. FIG. 7 is a top view showing the light guiding plate and the light source module according to a modified embodiment of that of FIGS. 6A and 6B, when viewed from above.

As shown in FIG. 1 and FIGS. 6A and 6B, the light source module 200 formed of the plurality of LED blocks B may be provided in plural, and the plurality of light source modules 200 may be disposed on the both side surfaces of the light guiding plate 100 to be opposed to each other. In addition, the driving unit 400 may be connected to each of the light source modules 200 and control a brightness value for each LED block B. The controlling of the brightness value may be performed by controlling the magnitude of a current signal applied to each LED block B. Accordingly, local dimming may be accomplished.

In detail, the respective LED blocks B contained in the light source module 200 may include one or more LED 210, and the brightness thereof may be controlled by different current signals applied via the driving unit 400. Each LED block B may include four LEDs 210 in the embodiment of the present invention; however, the present invention is not limited thereto. The number of LEDs contained in each block B may be properly selected as needed.

The light guiding plate 100 may include one or more optically distinguishable area. The area may be physically divided, and the light guiding plate 100 may be made of a plurality of division members 100A and 100B as shown in FIGS. 6A and 6B. Alternatively, the light guiding plate may have a separate structure in itself.

More specifically, as shown in FIG. 6B, the light guiding plate 100 may be divided into a plurality of areas by a junction surface 120 provided between the respective division members 100A and 100B, the junction surface controlling, for example, blocking the path of light. The respective areas of the light guiding plate 100 divided by the junction surface 120 may be separately driven without interference therebetween. In particular, local dimming may be more effectively implemented in conjunction with an individual control for each LED B.

Thus, unlike in FIGS. 6A and 6B, four light source modules 220 respectively disposed at four side surfaces of the light guiding plate 100, two side surfaces of which being disposed perpendicularly with respect to the other two side surfaces, may be provided as shown in FIG. 7. In this case, the light guiding plate 100 may be divided into at least four division members 100A, 100B, 100C and 100D.

Figure 8:
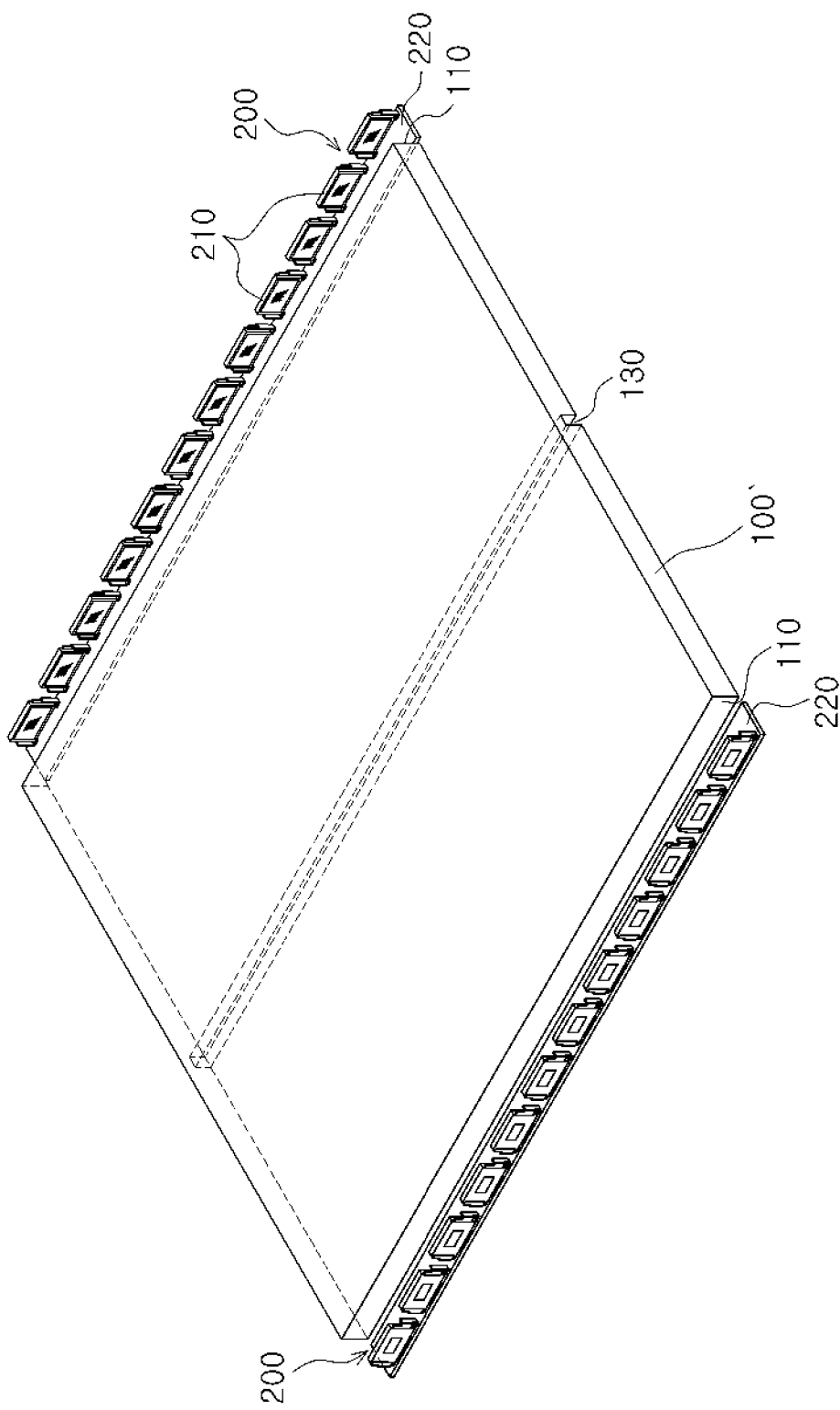
FIG. 8 is a schematic diagram of a light guiding plate employable in another embodiment of the present invention.

FIG. 8 is a schematic diagram of a light guiding plate employable in another embodiment of the present invention. FIGS. 9A through 9C are schematic diagrams of various modified examples of a groove portion in the light guiding plate of FIG. 8.

As shown in FIG. 8, a light guiding plate 100' according to another embodiment of the present invention may include at least one groove portion 130 capable of altering or blocking the path of light. The groove portion 130 may be depressed at a predetermined depth from the lower surface of the light guiding plate 10'0 toward the upper surface thereof, and may be formed to be parallel with or vertical to the light source module 200. However, the present invention is not limited thereto, and the groove portion 130 may be disposed in the horizontal direction and the vertical direction of the light guiding plate 100' from the center of the light guiding plate 100', thereby dividing the light guiding plate 100' into four areas. Accordingly, the respective areas of the light guiding plate 100', divided by the groove portion 130 may be separately driven without interference therebetween.

Figure 9:
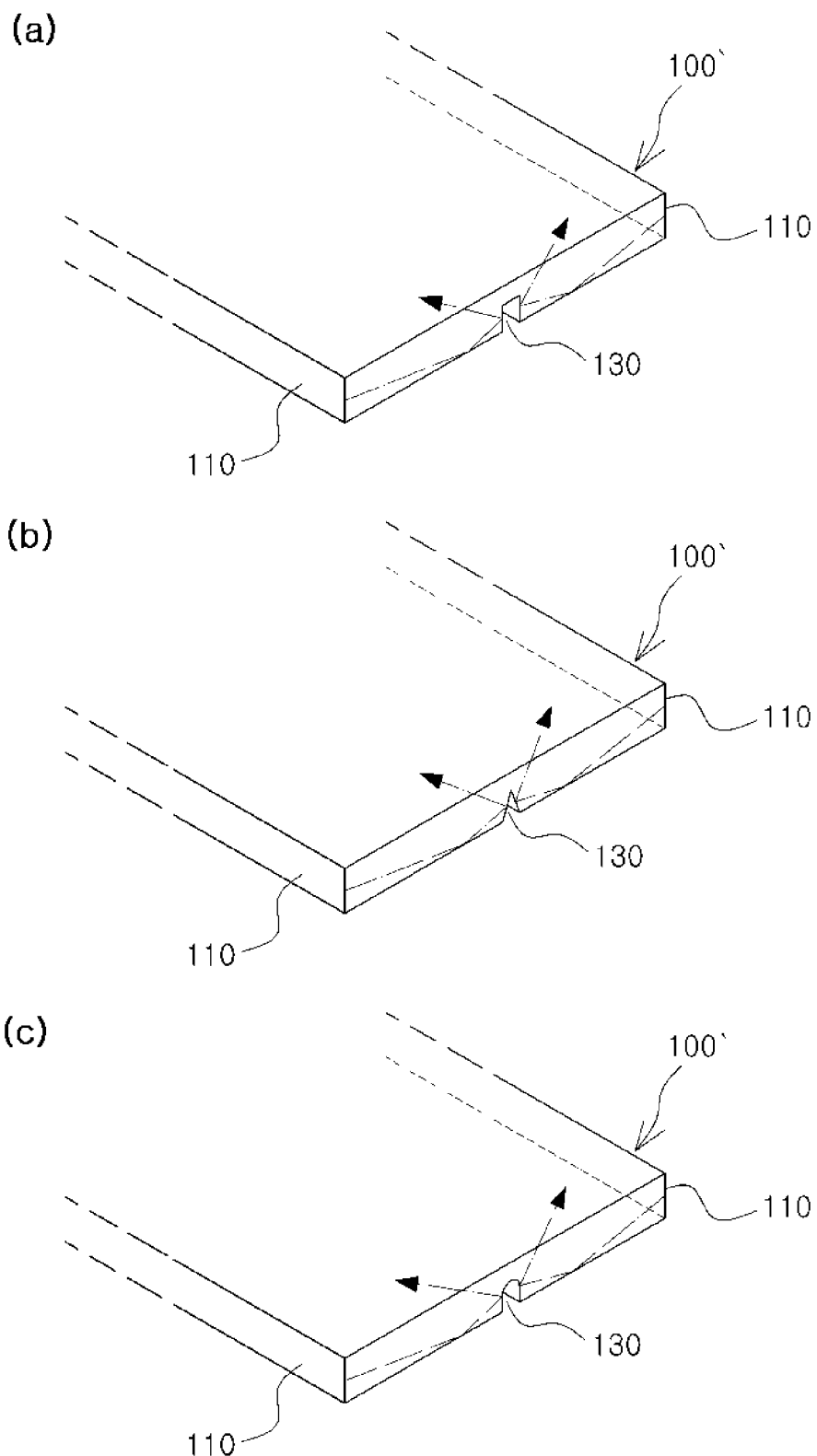
FIGS. 9A through 9C are schematic diagrams of various modified examples of a groove portion in the light guiding plate of FIG. 8.

As shown in FIG. 9, the groove portion 130 may be a triangular or semicircular-shaped structure, as well as a quadrilateral-shaped structure. In addition, the groove portion 130 may be a polygonal-shaped structure.

As described above, since the edge type backlight unit according to the embodiment of the present invention does not need to have a large thickness, unlike a direct type backlight unit according to the related art (that is, light is transferred to a liquid crystal panel by using the light guiding plate in the embodiment of the present invention), partial driving thereof may be allowed while the thickness thereof may be reduced. Accordingly, effects due to the partial driving (for example, increases in a contrast ratio due to a local dimming scheme, the implementation of clear image quality, or the like) may be sufficiently obtained, and the thinning of a production using the backlight unit may be advantageous.

Further, heat generated from the light source module may be much more efficiently conducted to the bottom chassis by increasing a contact area with the bottom chassis to thereby allow for the improvement of thermal efficiency.

As set forth above, according to embodiments of the invention, a backlight unit for a liquid crystal display, which is advantageous for a thin and large-sized product using the same and capable of implementing an effective local dimming, may be provided.

In addition, a backlight unit having an extended lifespan of an LED and superior optical characteristics, according to the improvement of thermal efficiency may be provided.

While the present invention has been shown and described in connection with the embodiments, it will be apparent to those skilled in the art that modifications and variations can be made without departing from the spirit and scope of the invention as defined by the appended claims.

What is claimed is:

1. A backlight unit, comprising:
a light guiding plate;
a light source module including a substrate provided with a circuit wiring and a plurality of light emitting diode (LED) blocks each including one or more LED mounted on the substrate to be positioned vertically with respect to the substrate, the one or more LED being disposed to face a side surface of the light guiding plate;
a bottom chassis including a base and a sidewall upwardly extending from a circumference of the base, and accommodating the light source module and the light guiding plate in such a manner that the one or more LED is disposed to be adjacent to the sidewall; and
a driving unit controlling a current signal applied to each of the plurality of LED blocks to thereby control brightness for each LED block.

2. The backlight unit of claim 1, wherein in the light source module, the substrate is mounted on the base to be positioned horizontally with respect to the base along the sidewall of the bottom chassis in such a manner that a light emitting surface of the one or more LED faces the light guiding plate and the other surface of the one or more LED faces the sidewall of the bottom chassis.

3. The backlight unit of claim 1, wherein the light source module is disposed between at least one side surface of the light guiding plate and the sidewall of the bottom chassis.

4. The backlight unit of claim 1, wherein the light source module includes a plurality of light source modules, and the plurality of light source modules include a first light source module and a second light source module respectively disposed at one side surface of the light guiding plate and the other side surface of the light guiding plate.

5. The backlight unit of claim 4, further comprising a third light source module and a fourth light source module respectively disposed at side surfaces of the light guiding plate, positioned vertically with respect to the first and second light source modules, while having the light guiding plate therebetween, and having a configuration the same as that of the first and second light source modules.

6. The backlight unit of claim 1, wherein the light guiding plate is formed of at least one or more division member.

7. The backlight unit of claim 1, wherein the light guiding plate is provided with one or more groove portion altering a path of light.

8. The backlight unit of claim 7, wherein the groove portion is depressed at a predetermined depth from a lower surface of the light guiding plate towards an upper surface of the light guiding plate.

9. The backlight unit of claim 7, wherein the groove portion is disposed in a horizontal direction or/and a vertical direction of the light guiding plate from a center of the light guiding plate.

10. The backlight unit of claim 1, wherein the one or more LED includes a body having a cavity formed therein and is equipped with lead terminals along a side surface and an end surface of the body, the lead terminals electrically connected to the circuit wiring to thereby be mounted on the substrate via the side surface and the end surface.

11. The backlight unit of claim 10, wherein the lead terminals include a first lead provided to be co-planar with a rear surface of the body and projected outwardly from the end surface of the body, and a second lead bent vertically from an end of the first lead to be extended towards a front surface of the body and having one end bent horizontally towards the side surface of the body.

12. The backlight unit of claim 11, wherein the second lead has an overall 'L' shaped structure so as to be parallel with the end surface and the side surface of the body.

13. The backlight unit of claim 10, wherein the one or more LED includes a heat sink penetrating the body to be outwardly exposed through the rear surface of the body, in a bottom surface of the cavity.

14. The backlight unit of claim 1, further comprising a reflecting plate disposed under the light guiding plate.

15. The backlight unit of claim 1, further comprising an optical sheet disposed on the light guiding plate.

* * * * *